Jan. 21, 1958   L. E. HOYER ET AL   2,820,679
JOURNAL BEARING LUBRICATORS
Filed Aug. 9, 1954   2 Sheets-Sheet 1

Inventors
Llewellyn E. Hoyer
Edward R. Gorcyca
By Wallace and Cannon
Attorneys

Jan. 21, 1958 L. E. HOYER ET AL 2,820,679
JOURNAL BEARING LUBRICATORS
Filed Aug. 9, 1954 2 Sheets-Sheet 2
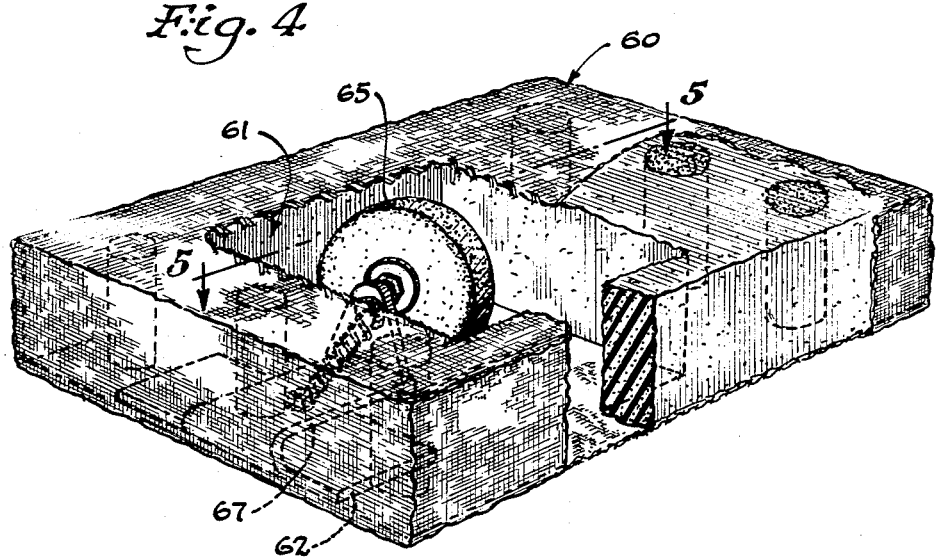
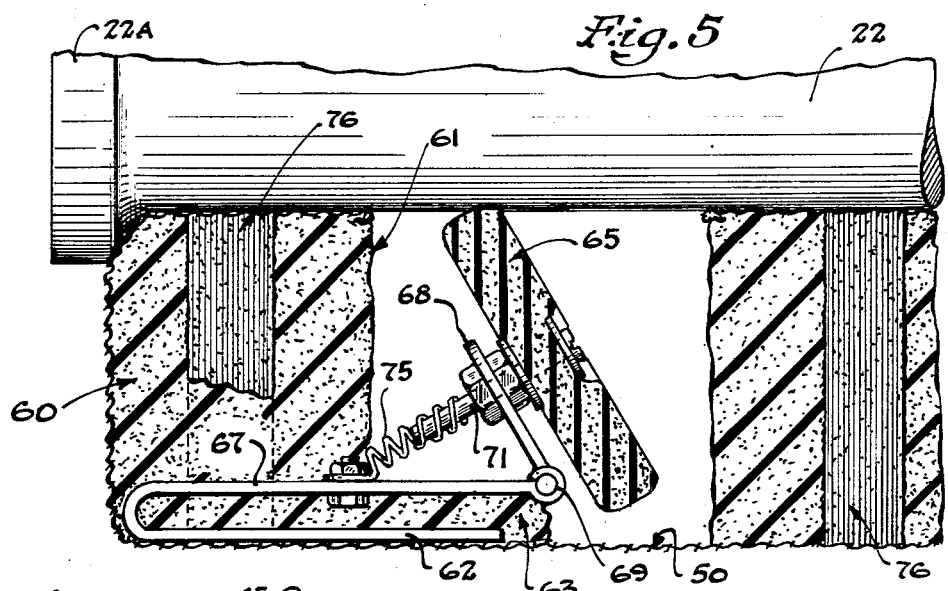
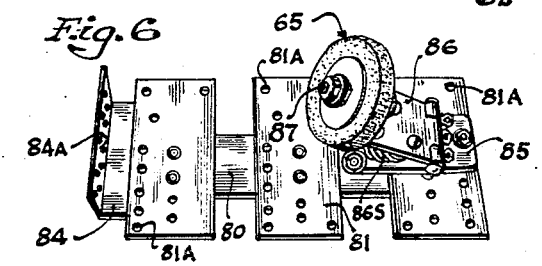
Inventors
Llewellyn E. Hoyer
Edward R. Gorcyca
By Wallace and Cannon
Attorneys

United States Patent Office 2,820,679
Patented Jan. 21, 1958

2,820,679

JOURNAL BEARING LUBRICATORS

Llewellyn E. Hoyer, Wyckoff, and Edward R. Gorcyca, Mahwah, N. J., assignors to American Brake Shoe Company, New York, N. Y., a corporation of Delaware Application August 9, 1954, Serial No. 448,556

6 Claims. (Cl. 308—91)

This invention relates to a lubricator for the journal bearing of a railway car.

Journal bearing lubricators of the type adapted to be disposed in the journal box of a railway car are generally of two kinds. Thus, the lubricator may be mechanical in nature in that a means operated by movement of the journal is arranged within the journal box for passing lubricant up to the journal bearing. On the other hand, the lubricator may take the form of composition material or the like arranged in the journal box to engage the journal and lubricate the same by a lubricant absorbed in the composition material.

There are many examples in the prior art of composition material adapted to be arranged in the journal box to absorb lubricant in the bottom thereof and relay the same by capillarity or wicking action to the journal, but such have not always performed satisfactorily. For instance, one well-known example of a composition lubricator intended to operate in this manner is waste packing stuffed into the journal box in the cavity between the journal and the bottom of the box, and it is also well-known that such packing represents a constant source of hot-box trouble in that the rotating journal tends to draw loose particles or strands of packing on to the face of the bearing causing the bearing to be wiped dry and develop hot spots.

It has heretofore been proposed that a bag be afforded to enclose waste packing or the like and also to arrange springs within such a package to press the waste packing upwardly against the journal, but this arrangement tends to be rolled to one side or the other of the box by rotating journal and consequently there is no assurance that the lubricator will remain at the bottom of the box where the lubricant seeks its level.

Pads of felt or other highly compacted fibrous material have also been mounted in the journal box to engage the journal and relay oil in the bottom of the box on to the journal by wicking action, but pads of this kind must generally be combined with a means in the nature of a spring or the like for holding the pad firmly against the journal. Consequently, mechanical failure of the means thus afforded for holding the pad against the journal results in an inoperative lubricator, and constant maintenance is required in this regard. Moreover, felt pad lubricators tend to take on a permanent set under compaction by the journal.

Recently it has been proposed to sew or mold a length of wicking material to a pad of oil-resistant sponge rubber or the like adapted to be inserted into the bottom of the journal box with the wick dipping into a supply of lubricant afforded therein, the arrangement being such that the pad serves to resiliently hold portions of the wicks in engagement with the rotating journal. Aside from the fact that the wicking material thus attached to the sponge pad holder tends to fray and be torn loose by the journal in many instances, causing hot box problems similar in nature to waste packing, considerable expense is involved in combining these elements in an operative arrangement, and inasmuch as damage to or expenditure of the wick requires a complete new installation such proposals have not been found feasible. Moreover, the wicking characteristics of such pads have not always assured that the journal is uniformly furnished with an adequate supply of lubricant.

The primary object of the present invention is to enable the journal of a railway car to be lubricated by wicking inserts of fibrous material removably arranged in a highly resilient sponge-like pad of oil resistant rubber or like material serving to hold the inserts against the journal and to absorb sustained compression without taking on a permanent set.

A further object of the present invention is to arrange the lubricator of the present invention in a foraminous envelope or sleeve of low friction, non-glazing characteristics preventing fibers or strands of the wicking inserts from being drawn up on to the journal bearing.

There have in addition been proposals in the prior art for lubricating the journal by a roller so mounted in the journal box as to be rotated by engagement with the journal and thereby relay lubricant in the bottom of the box on to the journal. Inasmuch as a lubricator of this kind functions in proportion to the rate of rotation of the journal, insufficient lubricant is furnished to the journal when the car first commences motion, whereas it is essential at this time that a supply of lubricant be furnished to the journal bearing. Moreover, while a lubricating roller of this kind is effective at high speeds to pass relatively large amounts of lubricant to the journal, such is not a uniform action along the entire length of the journal, and in the event of mechanical failure or breakdown of the roller, there is a total failure of lubricant being relayed to the journal.

Therefore, a further object of the present invention is to arrange a lubricating roller in a highly resilient spongelike pad of oil-resistant rubber or the like material having wick inserts of fibrous material disposed about the roller, whereby at low speeds of the car the wick inserts assure that lubricant is furnished immediately to the journal and in the event of mechanical failure of the roller at high speeds of the car the wick inserts will enable lubrication of the journal and the bearing to be continued until the roller can be repaired.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 4 is a perspective view, broken away, of a modified form of lubricator and incorporating a lubricating roller;

Fig. 5 is a sectional view taken on the line 5—5 of Fig. 4; and

Fig. 6 is a perspective view of a modified arrangement adapted to operatively support a lubricating roller.

Figure 1:
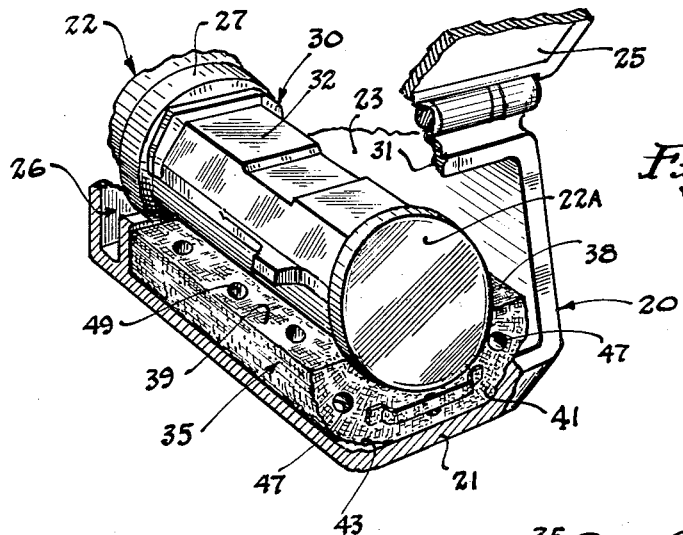
Fig. 1 is a perspective view of a lubricator of the present invention arranged in operative position within the journal box for the axle or journal of the railway car.

The present invention is illustrated in Figs. 1 to 5 as embodied in a resilient, oil-resistant sponge-like pad having high compressive stability and which is adapted to be mounted in the bottom of a railway journal box 20, Fig. 1, under compression between the bottom wall 21 of the journal box and the portion of the journal 22 of the railway car disposed in the box above the bottom wall thereof. The journal box includes vertical side walls as 23 extended upwardly from the bottom wall 21, and a lid 25 is arranged on a hinge to seal the end of the journal box 26 that is disposed outwardly of the car wheel (not shown). At the end of the journal box adjacent the car wheel is a slot 26 adapted to receive a dust guard of the usual kind (not shown). Such a dust guard is formed with a circular opening in the medial portion thereof which engages about a dust guard seat 27 of enlarged diameter on the journal. In this way the journal box is sealed at one end by the dust guard and at the opposite end by the lid 25.

A journal bearing 30 is arranged in the top of the journal box so that the arcuate bottom face including the bearing lining thereof may rotatably support the upper peripheral portion of the journal 22, and this bearing is retained in position by a wedge of the usual kind (not shown) adapted to be inserted in the journal box between the top wall 31 thereof and the back 32 of the bearing.

Under and in accordance with the present invention, a resilient sponge-like pad 35 formed of oil-resistant material of which neoprene sponge rubber is a typical example, is disposed in the cavity of the journal box which lies between the bottom wall thereof and the lower peripheral portion of the journal to hold inserts of wicking material under compression against the journal. In this manner, lubricant stored in the bottom of the journal box may be passed by capillarity or wicking action on to the journal.

Figure 2:
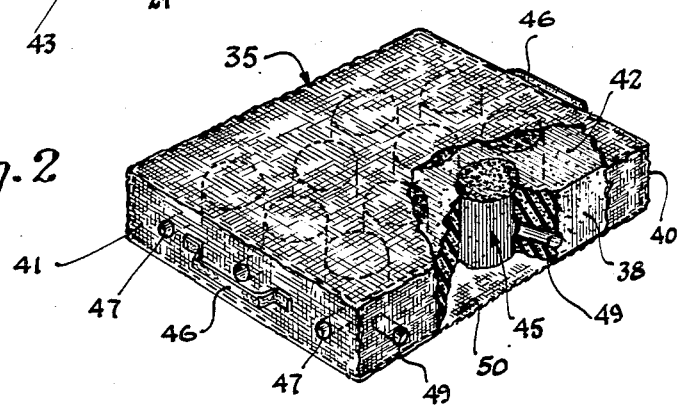
Fig. 2 is a perspective view, broken away, of one form of lubricator.

Thus, as shown in Figs. 1 and 2, the pad 35 is in the nature of a block of rectangular configuration including side walls as 38 and 39, end walls as 40 and 41, and top and bottom walls as 42 and 43. The pad 35 is constructed to be of such dimension that when disposed in the journal box as aforesaid, substantially the entire length of the journal is engaged by the top wall 42 of the pad 35, and the bottom wall 43 thereof extends along the bottom wall of the journal box from one end thereof to the other. Under this circumstance, one end of the pad is disposed adjacent the dust guard slot 26, and the opposite end is disposed behind an enlarged flange 22A at the end of the journal next to the journal box lid 25. Additionally, the dimensions of the pad 35 are such that the side walls 38 and 39 thereof are disposed well above the bottom wall of the journal box substantially at the axial center line of the journal, so that when disposed in operative position the pad 35 assumes a U-shape attitude with the vertically disposed portions of the bottom wall 43 thereof pressed outwardly against the side walls of the journal box resisting any tendency to be rolled to one side or the other by the journal 22 when rotating.

A plurality of cylindrical cells are formed in the pad 35, as can be seen in Fig. 2, to extend from the bottom wall to the top wall thereof, and arranged in these cells are cylindrical inserts or blocks 45 of highly absorbent fast wicking material such as felt, wool or cotton fibers, shredded wood pulp or synthetic fibers such as of nylon or the like. The wick inserts 45 are preferably arranged in a pattern throughout the pad so that substantially the entire surface area of the journal engaging the top wall of the pad 35 in the journal box may be uniformly furnished with lubricant passed upwardly by the wick inserts from the bottom of the box on to the journal. Handles as 46 are preferably attached to either end wall of the pad 35 to enable one end wall or the other to be inserted first into the journal box.

It is advantageous to facilitate flow of lubricant from the side and end walls of the lubricator to the wicking inserts. To this end, passages as 47 are formed in the end walls of the pad 35, and similar passages 49 are formed in the side walls. Such passages enable lubricant at corresponding levels in the journal box to flow directly in to the wick inserts, and this is of particular importance when the sponge-like pad 35 is of the closed rather than open-cell type.

One serious disadvantage of composition lubricators as heretofore constructed has been the tendency for the rotating journal to abrade the pad where such has been afforded, or to draw strands of wicking material out of the lubricator. In accordance with the present invention, we have found that this problem can be obviated by wrapping the pad as 35 in a foraminous sleeve or envelope 50 of low friction, non-glazing material such as woven glass fiber, cotton belting or the like which is substantially non-linting and which allows lubricant to pass freely therethrough to the journal.

Figure 3:
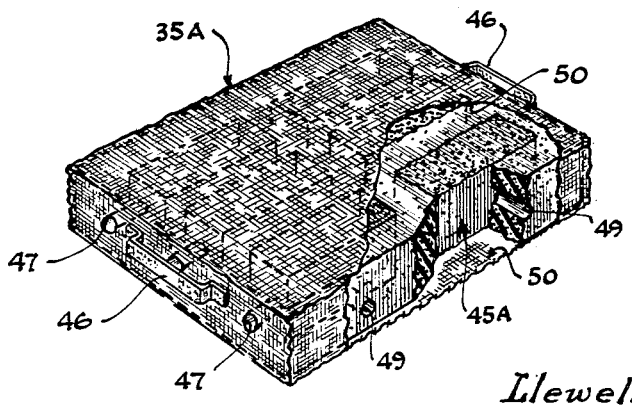
Fig. 3 is a perspective view, broken away, of another form of lubricator.

The wicking inserts as 45, Fig. 2, held against the journal by the resilient nature of the pad 35 need be of no particular construction, and in Fig. 3 a pad 35A is shown as formed with rectangular cells in which fibrous wicking material 45A of the foregoing type is packed. Otherwise, the construction is similar in all other respects to the lubricator 35.

A pad such as the foregoing for holding the wick inserts against the journal may be constructed to include a lubricating roller adapted to engage the journal and relay lubricant thereto by mechanical motion from the bottom of the journal box. Thus, as shown in Figs. 4 and 5, a highly resilient sponge-like pad 60 of oil-resistant spong rubber or the like is cored to include a relatively large lubricant-retaining recess 61 substantially in the medial portion thereof between the end and side walls. This recess extends from the bottom wall to the top wall of the pad 60 so as to trap lubricant in the bottom of the journal box, and an absorbent disc roller 65 which may also be of oil-resistant sponge rubber or the like is disposed therein to engage the journal and relay lubricant trapped in the recess 61 up on to the journal.

For mounting the roller 65 within the lubricator pad 60 in this instance, a flat mounting plate 62 is molded to a portion 63 of the bottom wall of the pad 60 that extends into the lubricant retaining recess 61, and an extension 67 formed at one end edge of the mounting plate is bent rearwardly back over the mounting plate to afford a spring platform disposed thereabove. At the end of the platform 67 disposed in the recess 61, a vertically disposed flange 68 is afforded which is hinged to the platform 67 as at 69. An axle 71 is afforded for the roller 65, and this axle is anchored in the flange so as to extend in normal relation thereto. Anchored at one end to the axle is a tension coil spring 75, and the opposite end of this spring in turn is anchored to the platform 67. In this manner, the lubricating roller 65 may be disposed in the lubricating reservoir 61 to engage and be rotated by the journal on its axle 71, and lubricant retained in the reservoir 61 at a level above the lower periphery of the roller 65 will be relayed thereby on to the journal when the car is in motion. When the car is not in motion, or to enable more effective lubrication to be accomplished at relatively low speeds, inserts 76 of wicking material like the wick inserts 45 and 45A described above are disposed in the peripheral portions of the pad 60 about the lubricating roller. In the event of failure of the lubricating roller, the inserts 76 will remain operative until the defect can be remedied.

Arrangements other than that disclosed in Fig. 5 may be resorted to for disposing a lubricating roller operatively in the lubricant reservoir 61. Thus, in Fig. 6 a mounting plate 80 is afforded of a length corresponding to the length of the pad 60, and cross arms as 81 are attached thereto so as to extend laterally of the pad from one side to the other. To facilitate attachment of the arrangement thus afforded to the bottom wall of the pad 60, openings as 81A are afforded at selected points in the cross arms 81 such that molding material of which the pad 60 is formed may flow therethrough during the molding operation to bond the cross arms and attached mounting plate 80 securely to the pad 60.

Another cross arm 84 is arranged at the end of the mounting plate 80 corresponding to the end of the pad 60 which is to be disposed adjacent the dust guard slot 26, Fig. 1. This cross arm includes a vertically disposed flange having openings as 84A formed therein such that the material of which the pad 60 is formed may likewise flow therethrough during molding of the pad 60.

The lubricating roller 65 in this instance is supported at the end of the mounting plate 80 away from the attached cross arm 84. Thus, a base plate 85 is attached to the mounting plate 80 at the end thereof opposite the cross arm 84 and a supporting plate 86 for the roller is hinged thereto. The hinged plate 86 includes an ear (not shown) in which the axle 87 for the roller 65 is supported. Retained between the plates 85 and 86 is a compression coil spring 86S, and the arrangement is such that when the roller assembly and pad 60 is positioned in the journal box the journal 22, Fig. 5, presses against the top edge of the roller 65 holding spring 86S under compression.

Thus, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A lubricator for the journal of a railway car comprising a highly resilient sponge-like pad of oil-resistant material adapted to be removably disposed in the journal box of the car under compression between the journal and the bottom wall of the box, a plurality of individual inserts of loose highly absorbent fast wicking fibrous material packed into spaced apart cells arranged throughout the pad to enable lubricant in the bottom of the box to be relayed by capillarity to the journal along substantially the entire length thereof, and a woven porous sleeve of low friction non-glazing material wrapped about said pad and about the exposed ends of said wicking material to enclose the wicking material and to prevent particles of wicking material from being drawn upwardly by the journal on to the journal bearing.

2. A lubricator for the journal of a railway car comprising a highly resilient sponge-like pad of oil-resistant material adapted to be removably disposed in the journal box of the car under compression between the journal and the bottom wall of the box, a plurality of individual inserts of highly absorbent wicking material packed into spaced apart cells in the pad extended from the bottom wall to the top wall thereof and arranged throughout to enable lubricant in the bottom of the box to be relayed by capillarity to the journal, a lubricating roller mounted in said pad to engage the journal and relay lubricant thereto under rotation by the journal from the bottom of the box, and a porous sleeve of low friction non-glazing material wrapped about said pad to prevent particles of wicking material from being drawn upwardly by the journal on to the journal bearing.

3. A lubricator for the journal of a railway car comprising a highly resilient sponge-like pad of oil-resistant material adapted to be removably disposed in the journal box of the car under compression between the journal and the bottom wall of the box, a plurality of individual inserts of highly absorbent wicking material packed into spaced apart cells arranged throughout the pad to enable lubricant in the bottom of the box to be relayed by capillarity to the journal, a relatively large recess for lubricant formed in the medial portion of the pad and opening at the bottom and top walls thereof, a lubricating roller mounted in said recess to engage the journal so as to be rotated thereby and relay lubricant in the recess to the journal, and a porous sleeve of low friction non-glazing material wrapped about said pad to prevent particles of wicking material from being drawn upwardly by the journal on to the journal bearing.

4. A lubricator for the journal of a railway car comprising a highly resilient sponge-like pad of oil-resistant material adapted to be removably disposed in the journal box of the car under compression between the journal and the bottom wall of the box, a plurality of individual inserts of highly absorbent fast wicking fibrous material packed into spaced apart cells arranged throughout the pad to enable lubricant in the bottom of the box to be relayed by capillarity to the journal along substantially the entire length thereof, passages formed in the side and end walls of said pad to transmit lubricant at corresponding levels in the journal box directly to said wicking inserts, and a porous sleeve of low friction non-glazing material wrapped about said pad and about the exposed ends of said wicking material to enclose the wicking material and to prevent particles of wicking material from being drawn upwardly by the journal on to the journal bearing.

5. A lubricator for the journal of a railway car comprising a pad of oil-resistant sponge rubber adapted to be removably disposed in the journal box of the car under compression between the journal and the bottom wall of the box, a plurality of individual inserts of loose highly absorbent fibrous wicking material packed into spaced apart cells in the pad extended from the bottom wall to the top wall thereof and arranged throughout to enable lubricant in the bottom of the box to be relayed by capillarity to the journal along substantially the entire length thereof, and a woven porous sleeve of low friction non-glazing material wrapped about said pad and about the exposed ends of said wicking material to enclose the wicking material and to prevent particles of wicking material from being drawn upwardly by the journal on to the journal bearing.

6. A lubricator for the journal of a railway car comprising a highly resilient sponge-like pad of oil-resistant material adapted to be removably disposed in the journal box of the car under compression between the journal and the bottom wall of the box, a plurality of individual inserts of highly absorbent wicking material packed into spaced apart cells in the pad extended from the bottom wall to the top wall thereof and arranged throughout the pad to enable lubricant in the bottom of the box to be relayed by capillarity to the journal, passages formed in the side and end walls of said pad to transmit lubricant at corresponding levels in the journal box directly to said wicking inserts, a relatively large recess for lubricant formed in the medial portion of the pad and opening at the bottom and top walls thereby, a lubricating roller mounted in said recess to engage the journal so as to be rotated thereby and relay lubricant in the recess to the journal, and a porous sleeve of low friction non-glazing material wrapped about said pad to prevent particles of wicking material from being drawn upwardly by the journal on to the journal bearing.

References Cited in the file of this patent

UNITED STATES PATENTS

| | | |
|---|---|---|
| 91,000 | Devlan | June 8, 1869 |
| 538,553 | Sichelschmidt | Apr. 30, 1895 |
| 648,065 | Brown | Apr. 24, 1900 |
| 2,049,225 | Ripley | July 28, 1936 |
| 2,264,250 | Shoemaker | Nov. 25, 1941 |
| 2,291,483 | Miller | July 28, 1942 |
| 2,713,524 | Hagy | July 19, 1955 |

FOREIGN PATENTS

| | | |
|---|---|---|
| 2,153 | Great Britain | 1870 |